(12) United States Patent
Zhang et al.

(10) Patent No.: US 11,914,594 B1
(45) Date of Patent: Feb. 27, 2024

(54) DYNAMICALLY CHANGING QUERY MINI-PLAN WITH TRUSTWORTHY AI

(71) Applicant: International Business Machines Corporation, Armonk, NY (US)

(72) Inventors: Hong Mei Zhang, Beijing (CN); Meng Wan, Beijing (CN); Sheng Yan Sun, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/147,435

(22) Filed: Dec. 28, 2022

(51) Int. Cl.
*G06F 16/2453* (2019.01)

(52) U.S. Cl.
CPC .. *G06F 16/24542* (2019.01); *G06F 16/24549* (2019.01)

(58) Field of Classification Search
CPC ............. G06F 16/24542; G06F 16/24549
See application file for complete search history.

(56) References Cited

U.S. PATENT DOCUMENTS

| | | | |
|---|---|---|---|
| 7,085,754 B2 | 8/2006 | Sinnott, Jr. | |
| 7,958,113 B2 | 6/2011 | Fan et al. | |
| 11,321,318 B2 | 5/2022 | Jiang et al. | |
| 2003/0167272 A1 | 9/2003 | Sinnott | |
| 2021/0133195 A1 | 5/2021 | Jiang et al. | |
| 2021/0311942 A1 | 10/2021 | Li et al. | |
| 2022/0188315 A1 | 6/2022 | Wang et al. | |
| 2023/0088484 A1* | 3/2023 | Abdelmalek | H04N 21/8133 340/323 R |

OTHER PUBLICATIONS

P. Menon et al., "Permutable Compiled Queries: Dynamically Adapting Compiled Queries without Recompiling," VLDB, Year: 2020, pp. 1-13.

* cited by examiner

*Primary Examiner* — Etienne P Leroux
(74) *Attorney, Agent, or Firm* — Patterson + Sheridan, LLP (57) ABSTRACT

A disclosed database system and enhanced methods implement enhanced mini-plans and dynamically changing a query mini-plan with trustworthy Artificial Intelligence (AI) to improve query execution performance in a database system. An AI cost model evaluates candidate mini-plans for executing a query. AI truth monitors evaluate the execution of the mini-plans, such as predicted input factors and adjusted mini-plans of one or more AI running data models. The AI truth monitors provide feedback to adjust the AI cost model based on evaluating the execution of the mini-plans. The AI truth monitors validate adjusted mini-plans, provide feedback to the AI cost model with improved overall prediction accuracy, and enhanced mini-plans to gain query performance.

20 Claims, 10 Drawing Sheets

QUERY  204

SELECT A.C1, A.C2, B.C3
FROM T1 AS A, T2 AS B,
T3 AS C
WHERE A.C1 = B.C1
AND A.C2 = C.C2
AND A.C1 =   :hostvar1
AND B.C2 <= :hostvar2
AND C.C3 <= :hostvar3
Order by A.C1, A.C2

FIG. 4

INPUT FACTORS 500 TO AI
COST MODEL 182

Filter factors, reliability
Cluster ratio, reliability
Buffer pool hit ratio, reliability
Columns correlation, reliability

FIG. 5

EXAMPLE INPUT FILTER FACTORS
VALUES 600 TO AI COST MODEL 182

A.C1='C' or 'E',
filter factors=0.65, reliability =0.98
filter factors=0.03, reliability =0.02
B.C2 <:hostvar2,
filter factors [0, 0.35], reliability =0.8
filter factors [0.35, 1], reliability =0.2
C.C3 <:hostvar3,
filter factors [0-0.35], reliability =0.2
filter factors [0.35-0.55], reliability =0.5
filter factors [0.55-1], reliability =0.3
T1.C1 cluster ratio 90%, reliability 0.9

DYNAMICALLY CHANGING QUERY MINI-PLAN WITH TRUSTWORTHY AI

BACKGROUND

The present invention relates to the database query-processing field, and more specifically, to dynamically changing a query mini-plan with trustworthy Artificial Intelligence (AI) technology.

A need exists for new techniques to enable improved query execution performance in a database system.

SUMMARY

Embodiments of the present disclosure provide enhanced methods for implementing enhanced mini-plans and dynamically changing a query mini-plan with an Artificial Intelligence (AI) Truth monitor to improve query execution performance in a database system.

In one disclosed non-limiting method, the database system evaluates, using an AI cost model, mini-plans for executing a query and an AI truth monitor evaluates the execution of the multiple mini-plans for the query. The AI truth monitor provides feedback to adjust the cost AI model based on evaluating the execution of the mini-plans.

In one disclosed non-limiting method, at runtime during the execution of the multiple mini-plans, one or more AI running data models access running data and dynamically predict input factors to the AI cost model. The AI running data models dynamically adjust the mini-plans to gain query performance based on the accessed data and a current database system environment. The AI truth monitor evaluates the predicted input factors and adjusted mini-plans of the AI running data models and provides feedback to the AI cost model to implement enhanced mini-plans and gain query performance.

Other disclosed embodiments include a computer system and computer program product for implementing enhanced mini-plans and dynamically changing a query mini-plan with trustworthy Artificial Intelligence (AI) comprising features of the above-disclosed methods.

DETAILED DESCRIPTION

Embodiments of the present disclosure provide enhanced methods for implementing enhanced mini-plans and dynamically changing a query mini-plan with trustworthy Artificial Intelligence (AI) to improve query execution performance in a database system. In one embodiment, the methods implement trustworthy AI by using an AI Truth monitor to check and validate runtime execution operations of the multiple mini-plans to determine query execution performance. An AI cost model evaluates multiple mini-plans to provide an access path comprising multiple mini-plans for execution of a given SQL statement. At runtime during the execution of the multiple mini-plans, one or more AI running data models access running data and dynamically predict input factors to the AI cost model and dynamically adjust the mini-plans to gain query performance based on the accessed data and a current database system environment.

For example, in one disclosed embodiment after accessing an available portion of query data during runtime, some input factors to the AI cost model such as filter factors, columns correlation, buffer pool hit ratio, and data cluster ratio can be predicted more precisely. One or more AI truth monitors evaluate the execution of the mini-plans, such as predicted input factors and adjusted mini-plans of the AI running data models. The AI truth monitors provide feedback to adjust the AI cost model based on evaluating the execution of the mini-plans. The AI truth monitors enable improved prediction inputs provided to the AI cost model. The AI truth monitors validate adjusted mini-plans, and provide improved overall prediction accuracy and enhanced mini-plans to gain query performance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
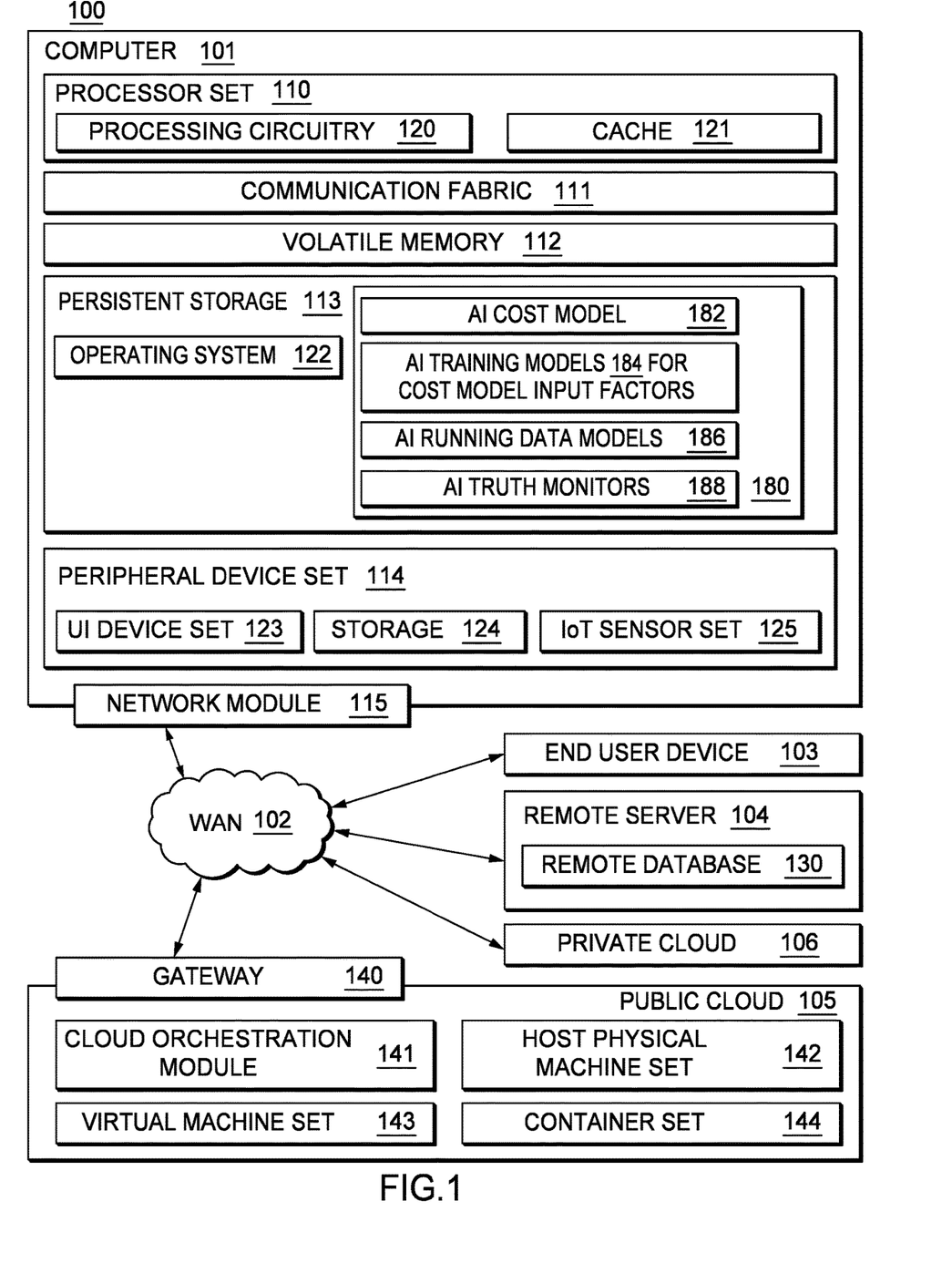
FIG. 1 is a block diagram of an example computer environment for use in conjunction with one or more disclosed embodiments for implementing enhanced mini-plans and dynamically changing a query mini-plan with a trustworthy Artificial Intelligence (AI)

Referring to FIG. 1, a computing environment 100 contains an example of an environment for the execution of at least some of the computer code involved in performing the inventive methods, such as AI Cost Model 182, AI Query Factors Training Models 184, AI Running Data Models 186, and AI Execution Truth Monitors 188 at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure provide enhanced mini-plans and dynamically altering query mini-plan with trustworthy AI technology. During runtime, after accessing part of data, some factors such as data skew degree, filter factor, buffer pool hit ratio, cluster ratio and the like, can be predicted more precisely in accordance with disclosed embodiments. Using these more precise predicted factors, which can be dynamically predicted when accessing data at runtime, enables dynamically altering a query mini-plan of the multiple mini-plans to partially alter the access path to gain better query performance.

A disclosed non-limiting method implements dynamically predicting input factors to an Artificial Intelligence (AI) cost model during query runtime, and altering a query mini-plan with trustworthy AI. In a disclosed embodiment, multiple training AI models are combined to predict the input factors of an AI cost module and flag the reliability of the predicted factors. The predicted factors include for example, predicate filter factors with reliability, cluster ratio with reliability, buffer hit ratio with reliability, and columns correlation with reliability. The predicted factors are input to an AI cost model. Based on the predicted factors and the corresponding reliability, the AI cost model provides an execution plan (e.g., access plan) with multiple candidate mini-plans, such as for a mini-plan chosen by low reliability factors. The candidate mini-plans can be different in an Access Method including index scan, table scan, multiple indexes, sparse index; Join Method including nest loop join, sort merge join, hybrid join, hash join; and Join Sequence.

In one disclosed embodiment, during runtime, AI models on running data can dynamically predict input factors to the AI cost model with low reliability based on the accessed part of the data and the concurrent system environment. These predicted input factors to the AI cost mode can be used to dynamically alter the query mini-plans to gain better query performance. For example, dynamically altering the query mini-plans can include dynamically switching a join method, such as to switch from a nest loop join to a hybrid join.

In one disclosed embodiment, based on the predicted input factors and adjusted query mini-plans performance results from dynamically altering the query mini-plans, AI truth monitors, such as drift, bias and explainable AI Truth monitors can enable AI model feedback for prediction optimization and enhanced query performance. For example, the AI monitors enable AI truth feedback to improve the prediction input factors to the AI cost model and AI training models of the database system, which can include multiple AI training models used to predict the input factors applied to the AI cost model and flag the reliability of the factors. The AI truth monitors enable feedback to improve the overall prediction of the AI cost model 182 used during execution plan bind time, AI Training Models 184 and of the AI Running Data Models 186 used during runtime. AI Truth validation with AI truth monitors of disclosed embodiments enables effective model feedback, enhanced mini-plans, and enhanced prediction of input factors applied to the AI cost model to achieve improved query performance.

Figure 2:
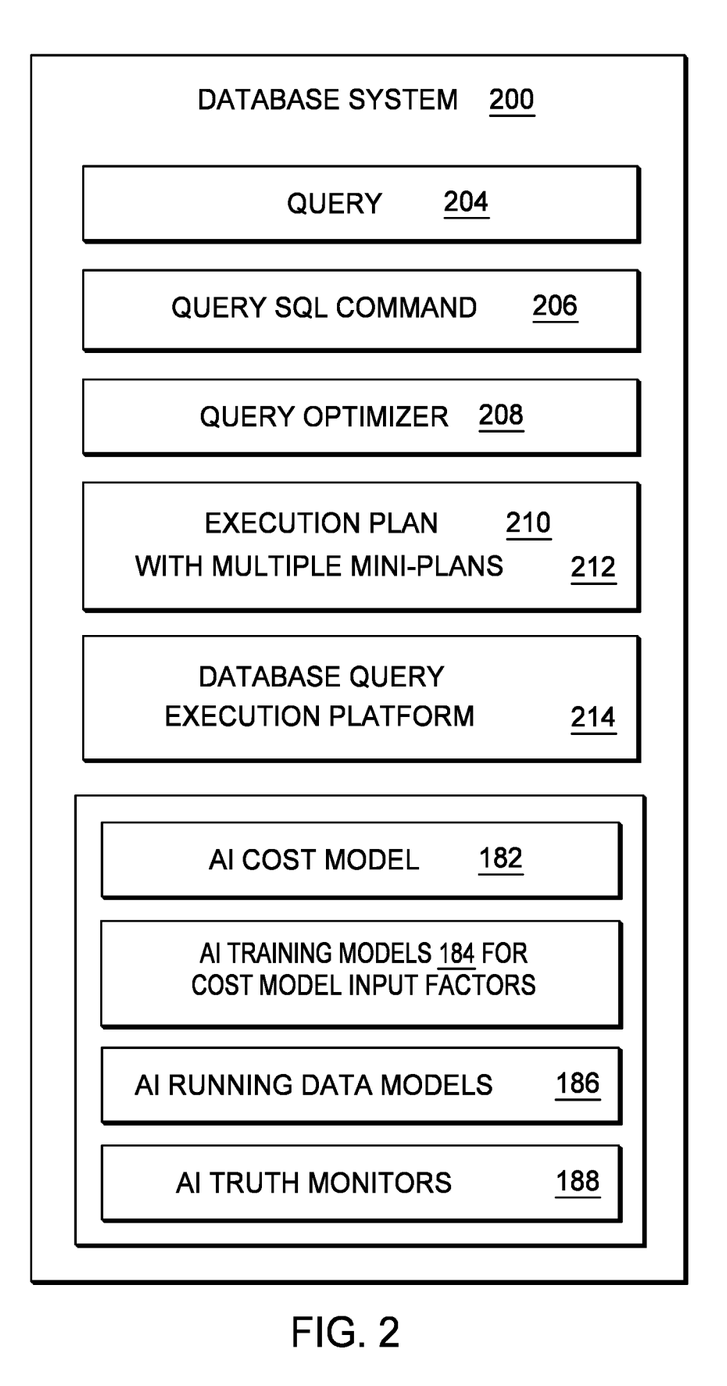
FIG. 2 is a block diagram of an example database system for implementing enhanced mini-plans and dynamically changing a query mini-plan with trustworthy Artificial Intelligence (AI) of disclosed embodiments.

Referring now to FIG. 2, there is shown an example database system 200 for implementing enhanced mini-plans and dynamically altering a query mini-plan with trustworthy AI technology of disclosed embodiments. Database system 200 can be used in conjunction with the computer 101 and cloud environment of the computing environment 100 of FIG. 1 for implementing enhanced mini-plans and dynamically altering a query mini-plan with trustworthy AI of disclosed embodiments.

Database system 200 receives a query 204 from a user application input to database system, and provides a Structured Query Language (SQL) command 206 for the query 204. The SQL command 206 is a SQL statement comprising a set of instructions that includes identifiers, parameters, variables, names, data types, and SQL reserved words that compile successfully for a given query 204.

Figure 4:
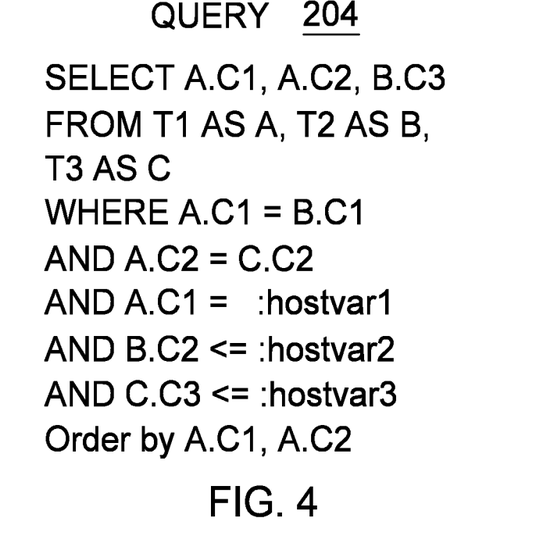
FIG. 4 illustrates an example Structured Query Language (SQL) command of the database system of FIG. 2 for implementing enhanced mini-plans and dynamically altering a query mini-plan with trustworthy AI technology disclosed embodiments.

Referring to FIG. 4, an illustrated example query SQL command 206 includes example Select variables, A.C1, BC1, C.C3, with columns C1, C2, C3, local predicates and definitions such as, A, B, C from Tables T1, T2, T3 with hostvar1, hostvar2, hostvar3 and an Order in which objects (A.C1,A.C2) are accessed, as shown.

Database system 200 includes a Query Optimizer 208 for implementing an execution plan 210 with multiple mini-plans 212 of disclosed embodiments. Database system 200 includes a Database Query Execution Platform to process query execution. Query optimization is central to the efficient operation of a modern relational database system 200.

The optimizer 208 is responsible for choosing an efficient execution plan 210 with multiple mini-plans 212. For example, an EXPLAIN Command of IBM DB2® generates an Execution Plan for an SQL command. The execution plan 210 with multiple mini-plans 212 define an access path accessing the data for a given SQL statement based on an estimated cost. In one embodiment, the execution plan 210 provides a collection of database data sources structured in the form of a tree to process the query execution as a single access plan during runtime. The query optimizer 208 is invoked when a new query enters the database system. For example, the optimizer 208 can calculate multiple different access paths for the given SQL statement and can choose one of the calculated access paths as the execution plan. The calculated access paths comprises multiple mini-plans 212, which can be generated by the optimizer 108, for example at bind and SQL prepare time for the query 204.

Database system 200 comprises the AI Cost Model 182, AI Training Models 184 for Cost Model Input Factors, AI Running Data Models 186, and AI Truth Monitors 188 of one or more disclosed embodiments for use in conjunction with the computer 101 and cloud environment of the computing environment 100 of FIG. 1.

Figure 3:
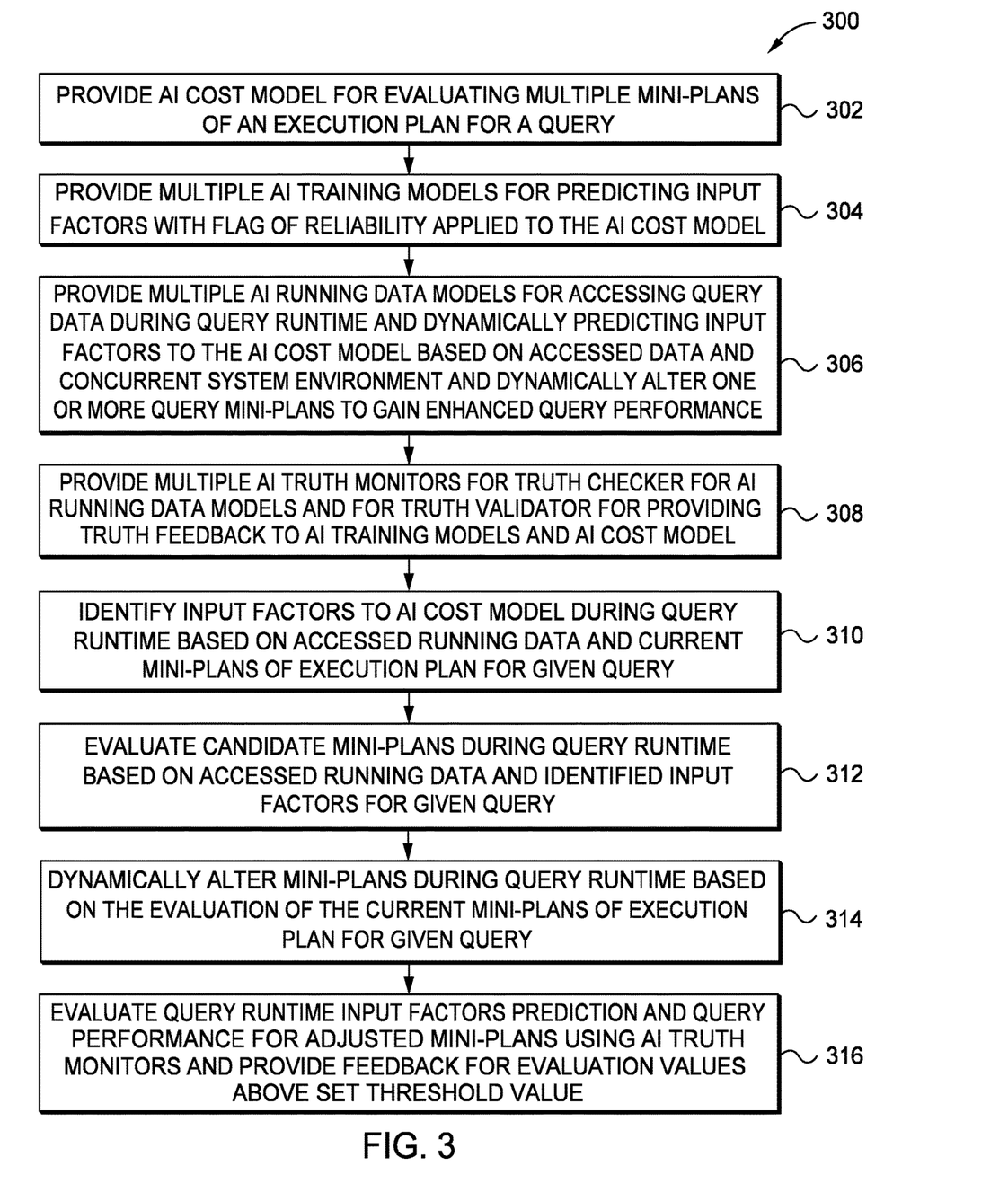
FIG. 3 is a flow chart illustrating example operations of the database system of FIG. 2 of an example method for implementing enhanced mini-plans and dynamically altering a query mini-plan with trustworthy AI of disclosed embodiments.

Referring to FIG. 3, an example method 300 may be implemented with computer 101 for example, with operations of method 300 provided by the AI Cost Model 182, AI Training Models 184 For Cost Model Input Factors, AI Running Data Models 186, and AI Execution Truth Monitors 188 for implementing enhanced mini-plans and dynamically altering a query mini-plan with trustworthy AI of disclosed embodiments.

As shown in FIG. 3, method 300 begins at a block 302 with database system 200 providing an AI Cost Model 182 for evaluating multiple mini-plans 212 of an execution plan 210 for a given query 204 of disclosed embodiments. At block 304, database system 200 provides multiple AI Training Models 184 for predicting Input Factors applied to the AI Cost Model 182 with a flag of reliability of the input factors to the AI Cost Model.

Figure 5:
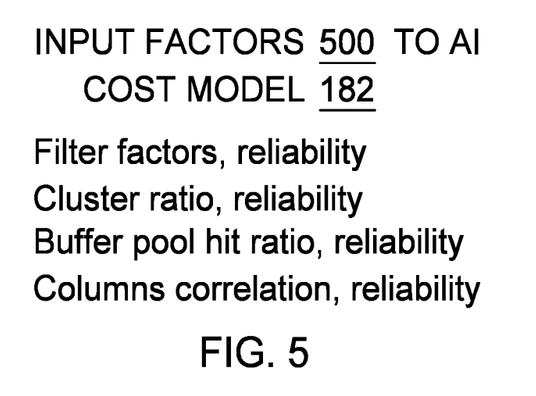
FIG. 5 illustrates example Input Factors applied to an AI Cost Model of the database system of FIG. 2 of disclosed embodiments.

FIG. 5 illustrates example Input Factors 500 to the AI Cost Model 182. As shown in FIG. 5, some Input Factors applied to the AI Cost Model 182 can include Predicate filter factors, Data cluster ratio, Buffer pool hit ratio, and Columns correlation, each provided with a predicted reliability value. Such example Input Factors 500 can directly affect the multiple mini-plans for executing a given query. Based on the Input Factors, the multiple mini-plans further can implement different access paths. Such different access paths can be based on "Access Method': index scan, table scan, multiple indexes, sparse index; 'Join Method': Nest loop join, Sort merge join, Hybrid join, Hash join; and 'Join Sequence' for the Input Factors. A selected access path for the multiple mini-plans is provided by the AI Cost Model 182 for executing the given query. During database bind-time (access path selection phase), the above factors typically cannot be known precisely; rather most of the above factors are estimated or predicted based on the available database history or database statistics. As a result, a bad access path can be chosen, such as resulting from estimation or prediction errors.

In disclosed embodiments during query data runtime, more precise Input Parameters or Input Factors 500 can be dynamically predicted to dynamically alter one or more of the multiple mini-plans and partially alter the access path to achieve better query performance. During run-time, after accessing part of the data for a given query, some Input Factors such as data skew degree, filter factor, buffer pool hit ratio, cluster ratio and the like can be more precisely predicted.

Figure 6:
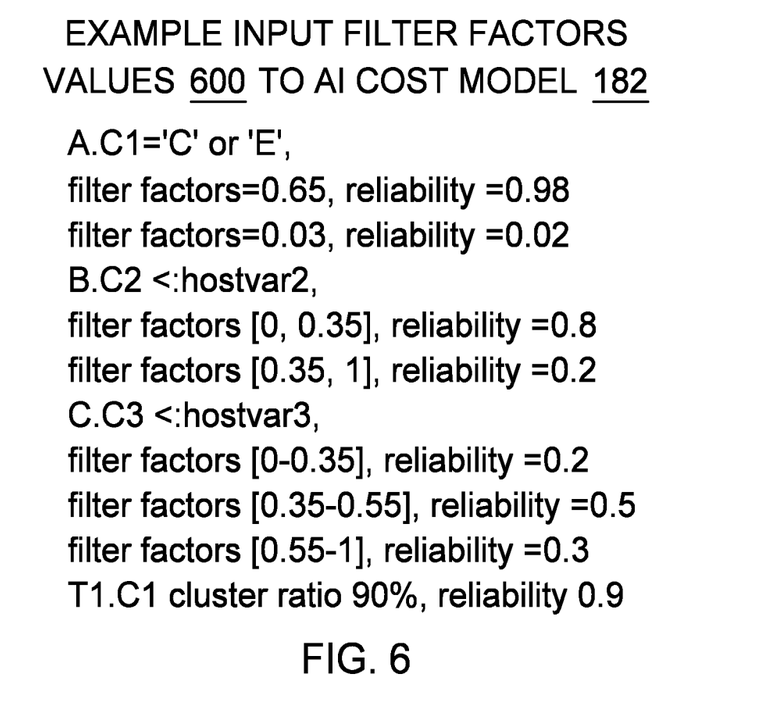
FIG. 6 illustrates example Input Filter Factors values applied to an AI Cost Model of the database system of FIG. 2 of disclosed embodiments.

FIG. 6 illustrates example Input Filter Factors values 600 to the AI Cost Model 182. As shown in FIG. 6, example Input Filter Factors values 600 applied to the AI Cost Model 182 include a calculated numerical value together with a reliability value, where, in one embodiment, reliability is between zero and one. In one example, the higher reliability value means better reliability.

As indicated at block 306 in FIG. 3, database system 200 provides multiple AI Running Data Models 186 that receive accessed data during query runtime. At block 306 the multiple AI Running Data Models 184 dynamically predict Input Factors applied to the AI Cost Model 182 based on retrieved query data for the given query. At a selected time during query runtime some input factor can be identified from the available accessed data to dynamically predict Input Factors, and used to evaluate the mini-plans currently used for executing the given query. At block 306 the multiple AI Running Data Models 186 can dynamical alter one or more query mini-plans to gain better query performance. For example, the multiple AI Running Data Models 186 include an AI execution plan 186 (using the current plan) accessing runtime query data and providing input to an AI predict factors plan 186 also accessing runtime query data. The AI predict factors plan 186 provides input to an AI evaluate candidate mini-plan 186 based on the accessed data. The AI evaluate candidate mini-plan 186 provides the evaluated candidate mini-plan to an AI dynamic alter plan 186 providing a dynamically altered mini-plan to the AI execution plan 186 for processing a remaining portion of the runtime query data.

As indicated at block 308 in FIG. 3, database system 200 provides multiple AI Truth Monitors 188 for providing an AI checker of AI Runtime Data Models 186 and validation of feedback to be selectively provided to the AI Cost Model 182 and the multiple AI Training Models 184 providing more precise Input Factors to the AI Cost Model 182. At block 310, database system 200 can identify more precise Input Factors during query runtime to be applied to the AI Cost Model 182. At block 310, the operations to identify more precise Input Factors for the AI Cost Model 182 are based on the accessed running data and using the mini-plans of the current execution plan for a given query during query runtime. At block 312, database system 200 evaluates candidate mini-plans during query runtime based on the accessed running data and the identified more precise Input Factors. At block 314, database system 200 dynamically alters one or more mini-plans based on the evaluation of the candidate mini-plans during query runtime and applies the altered mini-plans to the current execution plan for the given query for use during the remaining query runtime.

At block 316, database system 200 uses AI Truth Monitors 188 to evaluate the input factors prediction and query performance results of operations of the AI Runtime Data Models 186 at blocks 310, 312, 314 and can provide feedback to the AI cost model 182. For example feedback is selectively provided by AI Truth Monitors 188 based on the evaluations of the input factors prediction and query performance results that are determined to be above a respective set threshold value. For example, when the AI Truth Monitors 188 identifies query performance for the adjusted mini-plans above one set threshold value, feedback to the AI cost model 182 includes the identified Input Factors and the adjusted mini-plans during query runtime. The AI Truth Monitors 188 provide feedback of the identified Input Factors to the AI Training Models 184.

Figure 7:
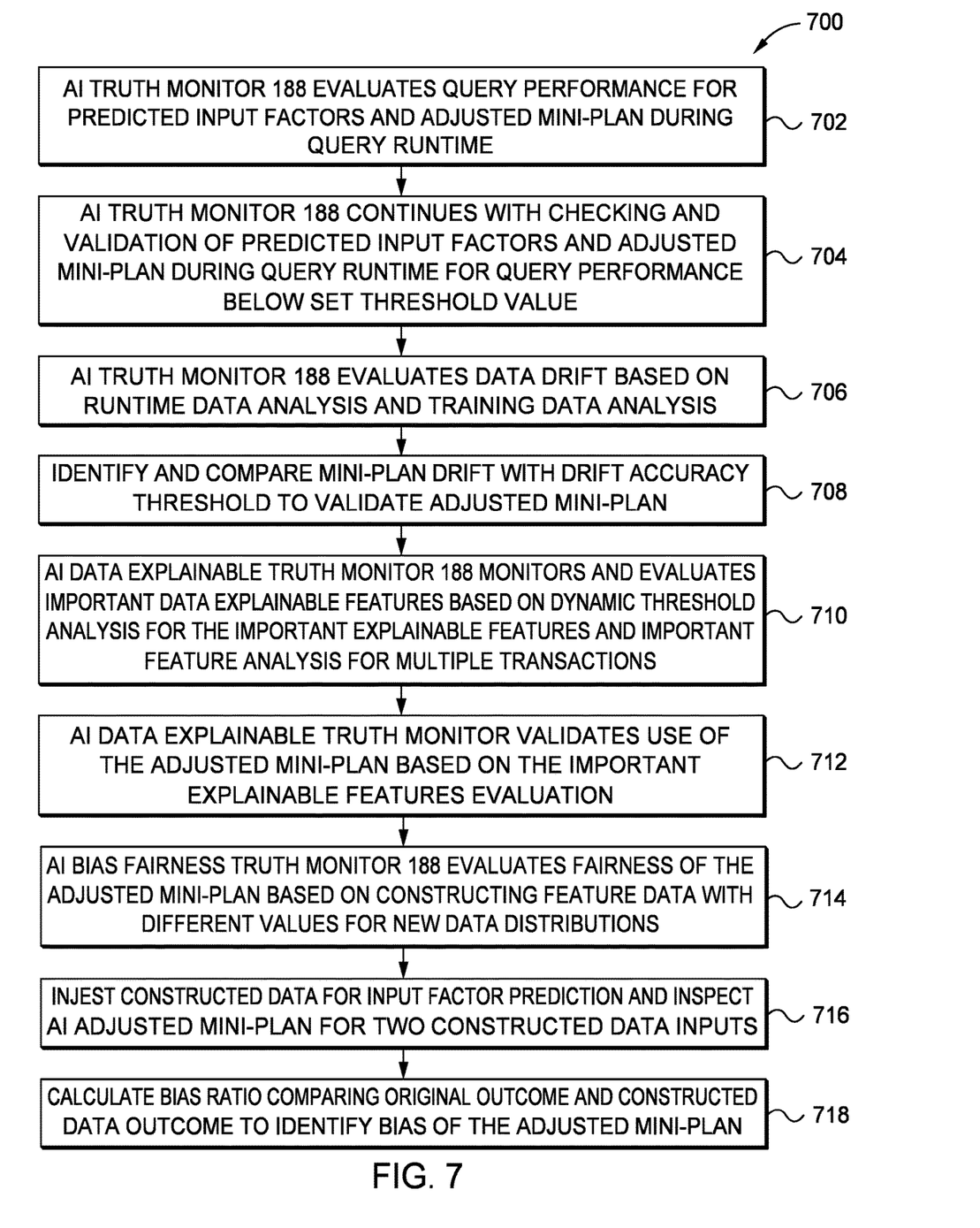
FIG. 7 illustrating example AI truth monitoring operations of the database system of FIG. 1 of an example method of disclosed embodiments.

Referring now to FIG. 7, AI Truth Monitors 188 of disclosed embodiments implement database system operations of an example method 700 for checking and validation of operations of the AI Runtime Data Models 186. During query data runtime, AI Truth Monitors 188 evaluate data drift, data explainable and bias or fairness in Runtime and Training operations of the AI Runtime Data Models 186.

In FIG. 7, the data drift, data explainable and bias evaluation operations of method 700 begins at block 702, with the AI Truth Monitors 188 evaluating query performance for predicted input factors and adjusted mini-plan provided by the AI Runtime Data Models 186. At block 704, the AI Truth Monitors 188 continue with checking and validation of the predicted input factors and adjusted mini-plan during query runtime with an identified query performance below the set threshold value.

Figure 8:
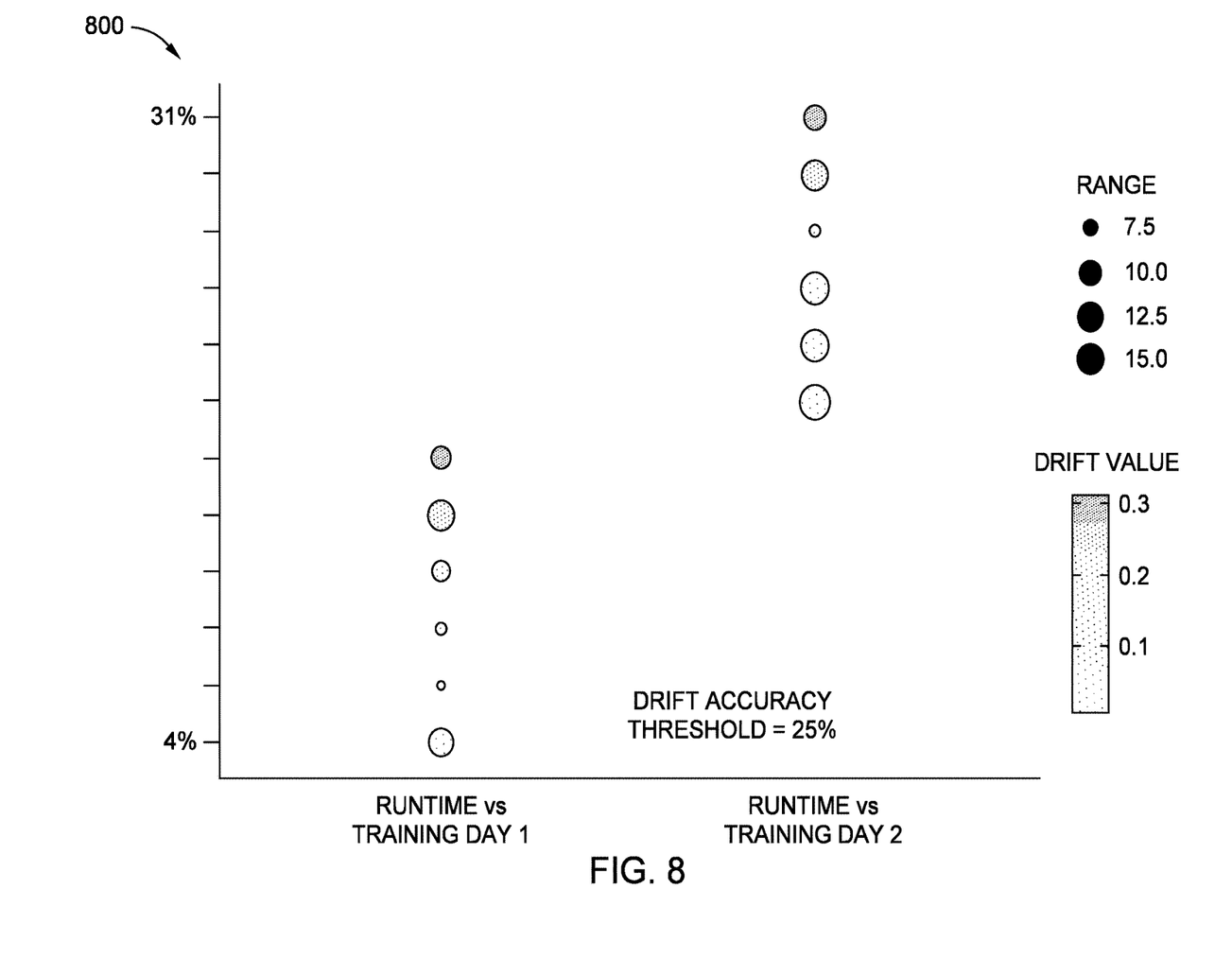
FIG. 8 illustrates example results for AI Truth mini-plan data drift monitoring operations of disclosed embodiments.

Referring also to FIG. 8, at block 706, one of the AI Truth Monitors 188 of database system 200 is an AI Data Drift Truth Monitor, which evaluates data drift for the adjusted AI runtime mini-plan model, based on runtime data analysis and training data analysis. FIG. 8 illustrates example runtime versus training drift values at different times (day 1, day 2) relative to the horizontal axis with example data drift percentages, as shown between 4% and 31%, relative to the vertical axis. At block 708, AI Data Drift Truth Monitor 188 identifies and compares evaluated data drift values for mini-plan drift, for example used to validate use of the adjusted mini-plan with the evaluated data drift.

Figure 9:
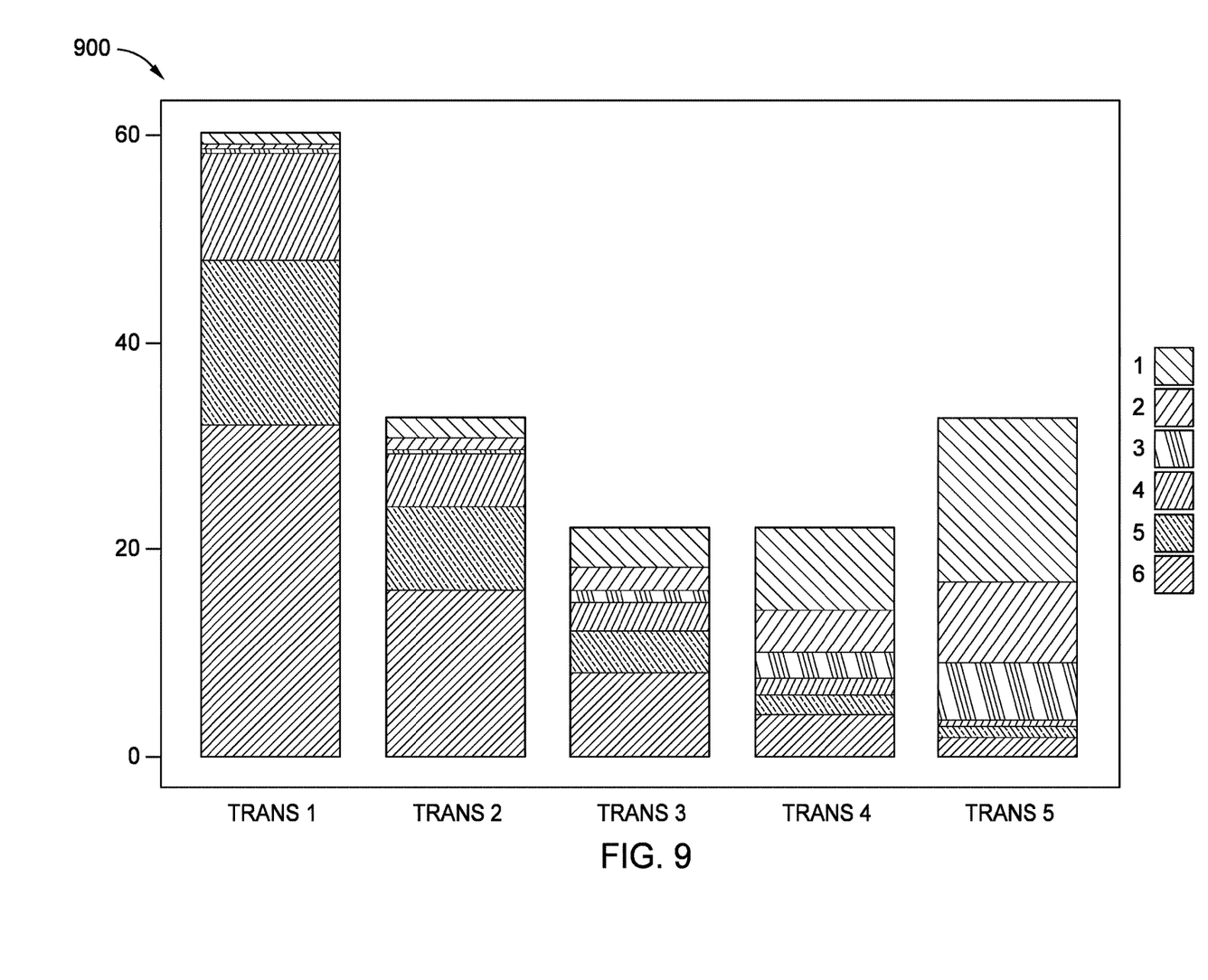
FIG. 9 illustrates example results for AI Truth explainable mini-plan model monitoring operations of disclosed embodiments.

Referring also to FIG. 9, at block 710, one of the AI Truth Monitors 188 of database system 200 is an AI Data Explainable Truth Monitor, which monitors and evaluates important explainable data features for the AI adjusted runtime mini-plan, based on dynamic threshold analysis for the important features and important feature analysis. FIG. 9 illustrates example results 900 for some explainable mini-plan model monitoring operations with relative different Input Factors for multiple transactions 1-5 (TRANS1-TRANS5) shown relative to the horizontal axis with example numerical values shown relative to the vertical axis. For example, six different features of Input Factors 1-6 include 1. Buffer pool hit ratio, 2. Cluster ratio, 3. Columns correlation, 4. Filter Factor 1, 5. Data skew, and 6. Filter Factor 2. At block 710, the AI Data Explainable Truth Monitor can identify and evaluate a ratio between the monitored different features with different values of data distribution for the multiple transactions, and perform retraining for the Input Factors when needed. At block 712, AI Data Explainable Truth Monitor 188 can validate use of the adjusted mini-plan (i.e., mark adjusted mini-plan as good or as bad) based on resulting evaluations of block 710.

Figure 10:
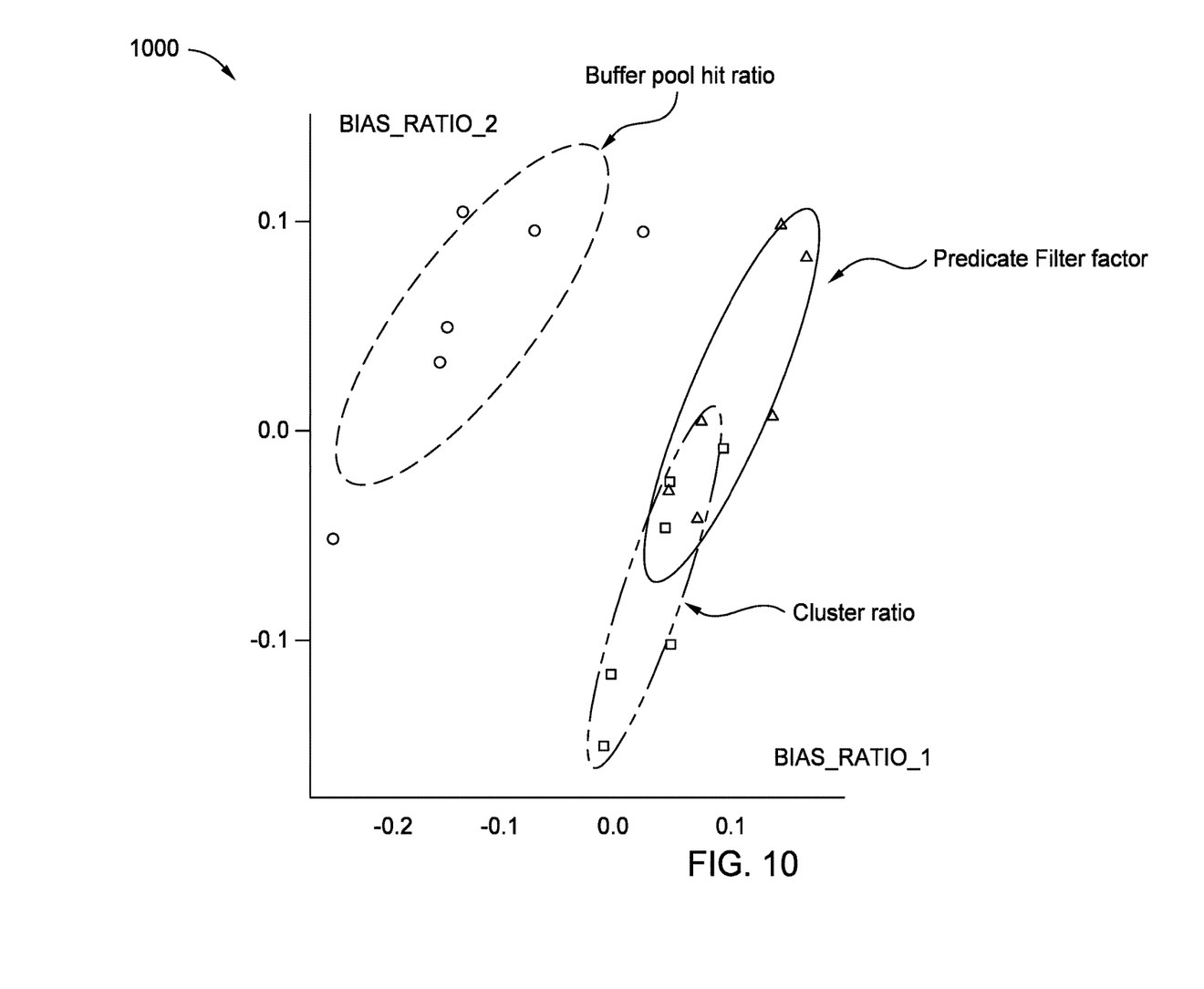
FIG. 10 illustrates example results for AI Truth bias and fairness monitoring operations of disclosed embodiments.

Referring also to FIG. 10, at block 714, one of the AI Truth Monitors 188 of database system 200 is an AI Bias Fairness Truth Monitor, which evaluates fairness of the AI adjusted runtime mini-plan in runtime and training operations. At block 714, the AI Bias Fairness Truth Monitor evaluates Bias or fairness of the AI adjusted runtime mini-plan based on the constructed feature data with different values providing new data distributions. At block 716, the AI Bias Fairness Truth Monitor uses the constructed feature data for predicting input factor and inspecting the AI adjusted mini-plan for two constructed data inputs. At block 718, the AI Bias Fairness Truth Monitor calculates bias ratio by comparing an original outcome and a constructed data outcome to identify bias of the adjusted mini-plan. FIG. 10 illustrates example bias ratio for feature data of Buffer pool hit ratio, Predicate Filter factor, and Data cluster ratio with Bias Ratio 1 shown relative to the horizontal axis and Bias Ratio 2 shown relative to the vertical axis. For example, in FIG. 10, bias ratio data points outside the associated encircled areas indicates values for the feature (Buffer pool hit ratio, Predicate Filter factor, and Data cluster ratio) that may bring in Bias for the AI adjusted runtime mini-plan.

In brief, database query performance is improved by the multiple min-plan candidates dynamically changed based on the operations of AI Truth Monitors 188 of database system 200 monitoring data drift changes in data distribution, explainable new data flow in the database data pool, and bias or fairness in the AI adjusted runtime mini-plan of disclosed embodiments. Such monitoring operations of AI Truth Monitors 188 enable effective runtime checking and validating feedback, implementing enhanced mini-plans and dynamically altering the mini-plans during runtime of disclosed embodiments.

While the foregoing is directed to embodiments of the present invention, other and further embodiments of the invention may be devised without departing from the basic scope thereof, and the scope thereof is determined by the claims that follow.

What is claimed is:

1. A method comprising:
evaluating, using an Artificial Intelligence (AI) cost model, mini-plans for executing a query;
evaluating, using an AI truth monitor, the execution of the mini-plans for the query; and
providing feedback to adjust the cost AI model based on evaluating the execution of the mini-plans using the AI truth monitor.

2. The method of claim 1, wherein evaluating, using the AI cost model, mini-plans for executing a query comprises evaluating multiple candidate mini-plans based on predicted parameters with a corresponding reliability value, wherein the predicted parameters are predicted using one or more AI training models based on stored database operational values.

3. The method of claim 2, wherein the predicted parameters comprise one or more of buffer pool hit ratio, data cluster ratio, column correlation and predicate filter factors.

4. The method of claim 1, further comprise using AI running data models accessing runtime data and dynamically identifying predicted parameters during query runtime based on accessed runtime data.

5. The method of claim 4, further comprise using the AI truth monitor to dynamically adjust a mini-plan during query runtime based on the accessed data.

6. The method of claim 1, wherein evaluating, using the AI truth monitor, the execution of the mini-plans comprises using the AI truth monitor to evaluate data drift based on runtime data analysis and training data analysis to validate the feedback.

7. The method of claim 1, wherein evaluating, using the AI truth monitor, the execution of the mini-plans comprises using the AI truth monitor to identify mini-plan data drift to validate a mini-plan adjusted during query runtime based on accessed data.

8. The method of claim 1, wherein evaluating, using the AI truth monitor, the execution of the mini-plans comprises using the AI truth monitor to evaluate explainable data features based on dynamic threshold analysis of the explainable data features.

9. The method of claim 8, further comprise using the AI truth monitor to validate a mini-plan adjusted during query runtime based on evaluating the explainable data features.

10. The method of claim 1, evaluating, using the AI truth monitor, the execution of the mini-plans comprises using the AI truth monitor to evaluate bias of the mini-plans based on constructed feature data with different values and calculating a bias ratio comparing outputs for original and constructed feature data to identify bias of the mini-plans.

11. A system, comprising:
a processor; and
a memory, wherein the memory includes a computer program product configured to perform operations for implementing enhanced mini-plans and dynamically altering a query min-plan with trustworthy Artificial Intelligence (AI), the operations comprising:
evaluating, using an AI cost model, mini-plans for executing a query;
evaluating, using an AI truth monitor, the execution of the mini-plans for the query; and
providing feedback to adjust the cost AI model based on evaluating the execution of the mini-plans.

12. The system of claim 11, wherein evaluating, using the AI cost model, mini-plans for executing a query comprises evaluating multiple candidate mini-plans based on predicted parameters with a corresponding reliability value, wherein the predicted parameters are predicted using AI models based on stored database operational values.

13. The system of claim 12, further comprise using an AI running data model to access runtime data and dynamically identify predicted parameters during query runtime.

14. The system of claim 13, further comprise using the AI running data model to dynamically adjust a mini-plan during query runtime based on the accessed data.

15. The system of claim 11, wherein evaluating, using an AI truth monitor, the execution of the mini-plans comprises using the AI truth monitor to evaluate one or more of data drift, explainable data features, and bias of the mini-plans.

16. A computer program product for implementing enhanced mini-plans and dynamically changing a query mini-plan with trustworthy Artificial Intelligence (AI), the computer program product comprising:
a computer-readable storage medium having computer-readable program code embodied therewith, the computer-readable program code executable by one or more computer processors to perform an operation comprising:
evaluating, using an AI cost model, mini-plans for executing a query;
evaluating, using an AI truth monitor, the execution of the mini-plans for the query; and
providing feedback to adjust the cost AI model based on evaluating the execution of the mini-plans.

17. The computer program product of claim 16, wherein evaluating, using the AI cost model, mini-plans for query execution comprises evaluating multiple candidate mini-plans based on predicted parameters with a corresponding reliability value, wherein the predicted parameters are predicted using AI models based on stored database operational values.

18. The computer program product of claim 16, further comprise using an AI running data model accessing runtime data to dynamically identify predicted parameters during query runtime.

19. The computer program product of claim 18, further comprise using the AI running data model to dynamically adjust a mini-plan during query runtime based on the accessed data.

20. The computer program product of claim 16, wherein evaluating, using the AI truth monitor, the execution of the mini-plans comprises using the AI truth monitor to evaluate one or more of data drift, explainable data features, and bias of the mini-plans.

* * * * *